United States Patent [19]

Kuga et al.

[11] Patent Number: 5,677,729
[45] Date of Patent: Oct. 14, 1997

[54] PANORAMIC VISION APPARATUS

[75] Inventors: Kaeko Kuga; Takuzo Uemura, both of Kyoto, Japan

[73] Assignee: Rohm Co., Ltd., Kyoto, Japan

[21] Appl. No.: 412,694

[22] Filed: Mar. 29, 1995

[30] Foreign Application Priority Data

Mar. 30, 1994 [JP] Japan .................. 6-060413

[51] Int. Cl.$^6$ .................................................. H04N 7/00
[52] U.S. Cl. .................. 348/37; 348/203; 348/36
[58] Field of Search ...................... 348/36, 37, 38, 348/39, 61, 337, 344, 369, 744, 759, 766, 790, 202, 203, 204, 205, 206, 745–747, 142, 146, 167–168, 209; 250/334; 359/202, 211, 212, 214, 220, 221, 223, 225, 226; 350/208.1, 227.26, 235, 206.2; H04N 7/00

[56] References Cited

U.S. PATENT DOCUMENTS

| | | | |
|---|---|---|---|
| 3,723,651 | 3/1973 | Gorgo | 348/766 |
| 3,894,798 | 7/1975 | Wolf | 353/122 |
| 3,959,582 | 5/1976 | Law et al. | 348/37 |
| 3,992,718 | 11/1976 | Driskell | 348/36 |
| 4,043,672 | 8/1977 | Baumgartner | 348/37 |
| 4,242,703 | 12/1980 | Tsuboshima et al. | 348/500 |
| 4,656,506 | 4/1987 | Ritchey | 348/39 |
| 4,963,962 | 10/1990 | Kruegle et al. | 348/369 |
| 4,982,092 | 1/1991 | Jehle | 348/37 |
| 5,153,716 | 10/1992 | Smith | 348/39 |

FOREIGN PATENT DOCUMENTS 0029064  1/1989  Japan .................. 348/39

Primary Examiner—Andrew Faile
Assistant Examiner—Vincent F. Boccio
Attorney, Agent, or Firm—Nikaido Marmelstein Murray & Oram LLP

[57] ABSTRACT

A panoramic vision apparatus having a simple structure is provided which produces an image from which the viewer feels a natural stretch. A shooter and a display are each provided with a prism. The shooting range is changed by a rotation of the prism of the shooter and the projection position is changed by changing the direction of the projected light by a rotation of the prism of the display. The shooter outputs a direction signal representative of the direction of the prism of the shooter in synchronism with a video signal. The display sets the direction of the prism thereof in accordance with the direction represented by the signal to project an image.

6 Claims, 2 Drawing Sheets

PANORAMIC VISION APPARATUS

BACKGROUND OF THE INVENTION

1. Field of the Invention

The present invention relates to a panoramic vision apparatus which shoots a wide range of area to reproduce and display an image.

2. Description of the Prior Art

The shooting range of a video camera is limited by an angle of view decided by geometric conditions of the camera such as the focal length of the taking lens, the longitudinal and lateral dimensions of the image sensing device and the distance between the taking lens and the image sensing device. In recent years, a video camera employing as the taking lens a zoom lens which continuously changes the focal length has been widespread and the shooting range can be variably set. When the focal length of the taking lens is set to be short, the angle of view increases, so that a wider range is shot. When the focal length is set to be long, the angle of view decreases, so that a narrower range is shot.

However, since the display area of the apparatus which reproduces and displays the recorded image is fixed, the image is displayed in the fixed range irrespective of the size of the shooting range. In an image which is shot at a shorter focal length, an image of a wide range is displayed within the fixed range, so that the photographic objects are displayed being reduced. In an image which is shot at a longer focal length, an image of a narrow range is displayed within the same fixed range, so that the photographic objects are displayed being enlarged. That is, even if the focal length of the taking lens is changed, the difference is merely whether the photographic objects are displayed being enlarged or reduced when the image is reproduced and displayed.

The human eye has a wide field of view and watches only a part thereof. The objects watched by the eye are recognized as clear images by the brain and the objects in the range not watched are recognized as blurred images. The normal human vision is such that the clear images are recognized among the blurred images. Natural three-dimensional images are obtained under this condition.

The display range of a normal display apparatus is set within a range approximately of a size such that the human eye can watch, and the entire area of the displayed image is recognized as a clear image. Therefore, natural stretch of images cannot be felt from the displayed image. Some large size display apparatuses have display ranges exceeding the range that the human eye can watch. However, merely by increasing the display range, the image is simply displayed being enlarged, and an image from which the viewer feels the natural stretch cannot be displayed.

SUMMARY OF THE INVENTION

An object of the present invention is to provide a panoramic vision apparatus having a simple structure which shoots a wide range to reproduce and display an image from which the viewer feels the natural stretch.

To achieve the above-mentioned object, according to the present invention, a shooter and a display of the panoramic vision apparatus are each provided with a rotatable optical device. The shooting range is changed by a rotation of the optical device of the shooter and the projection position is changed by changing the direction of the projected light by a rotation of the optical device of the display. The shooter outputs a direction signal representative of the direction of the optical device in synchronism with a video signal. The display sets the direction of the optical device thereof in accordance with the direction signal to project an image. As the rotatable optical devices, prisms or polygonal mirrors are used.

According to the above features, a wide range can be scanned and shot by the rotation of the optical device of the shooter and the image is projected in the direction corresponding to the shooting direction by the rotation of the optical device of the display. In addition, since only the optical devices are rotated, a wide range can be scanned for a short period of time and the repetition and continuation of the scanning are easy both in shooting and in projection.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
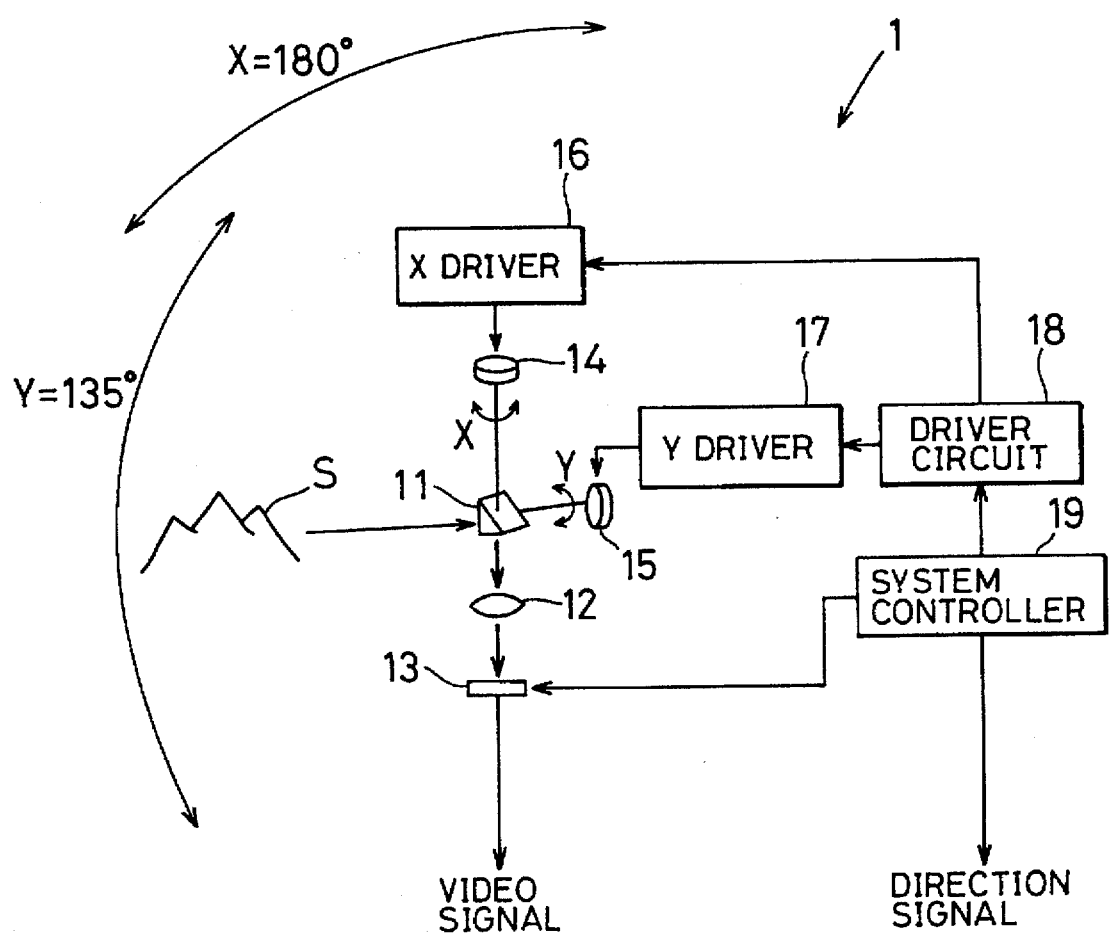
FIG. 1 schematically shows the arrangement of a shooter of a panoramic vision apparatus of the present invention.

A panoramic vision apparatus of the present invention includes a shooter and a display. FIG. 1 schematically shows the arrangement of the shooter 1.

In FIG. 1, reference numeral 11 represents a prism which is rotatable in the horizontal and vertical directions, reference numeral 12 represents a taking lens, and reference numeral 13 represents a charge coupled device (CCD) serving as an image sensing device. Reference numeral 14 represents a motor which rotates the prism 11 in the horizontal direction (i.e. in the X direction), and reference numeral 15 represents a motor which rotates the prism 11 in the vertical direction (i.e. in the Y direction). Reference numeral 16 represents a driver which supplies a driving signal to the motor 14, and reference numeral 17 represents a driver which supplies a driving signal to the motor 15. The drivers 16 and 17 are controlled by a system controller 19 through a driver circuit 18. S represents an object to be shot.

The rotation range of the prism 11 is 180° in the X direction and 135° in the Y direction. When the shooter 1 is set horizontally, the prism 11 rotates at up to 90° from the front to the left and right, respectively, and at up to 135° from the horizon to above. The prism 11 and the CCD 13 are arranged on the optical axis of the shooting lens 12. Light beams from different shooting ranges are incident on the CCD 13 as the prism 11 rotates.

The operation of the shooter 1 structured as described above will be described. First, the system controller 19 rotates the prism 11 through the driver circuit 18, the X driver 16 and the Y driver 17 to set it at an initial position, i.e. at a position where the rotation angle in the X direction is −90° and the rotation angle in the Y direction is 0°. Then, the system controller 19 supplies the CCD 13 with a signal specifying shooting. Receiving incident light, the CCD 13 performs shooting. Thereby, the shooting of the first frame is performed. After the shooting with the prism 11 at the initial position is performed, the system controller 19 rotates the prism 11 in the X direction at a predetermined angle $A_x$ and then stops it. Then, the system controller 19 supplies the CCD 13 with the shooting specification to perform shooting of the next frame. The rotation of the prism 11 at the predetermined angle $A_x$, the stopping of the prism 11 and the shooting by the CCD 13 are repeated until the rotation angle of the prism 11 reaches 90°.

The predetermined angle $A_x$ of the rotation angle of the prism 11 is set to equal the horizontal angle of view of the CCD 13 in consideration of geometric conditions such as the focal length of the taking lens 12, the length in the horizontal direction (in the X direction) of the light receiving surface of the CCD 13 and the distance between the taking lens 12 and the CCD 13. Therefore, the shooting ranges of the frames do not overlap one another and are continuous in the horizontal direction.

When the rotation angle of the prism 11 reaches 90°, the system controller 19 rotates the prism 11 in the Y direction at a predetermined angle $A_y$ and then stops it, and supplies the CCD 13 with the shooting specification to perform shooting. Then, the prism 11 is rotated at an angle of $-A_x$ in the X direction to perform shooting. The rotation in the opposite direction in the X direction and the shooting are repeated until the rotation angle in the X direction of the prism 11 is returned to −90°.

Thereafter, the rotation in the X direction of the prism 11 at the predetermined angle $A_x$ or $-A_x$ and the shooting, and the rotation in the Y direction at the predetermined angle $A_y$ are repeated in a similar manner. The rotation in the Y direction of the prism 11 is repeated until the rotation angle reaches 135°. When the rotation and the shooting in the X direction with a rotation angle in the Y direction of 135° is finished, the system controller 19 returns the prism 11 again to the initial position and continues the repetition of the above-described operations.

The predetermined angle $A_y$ of the rotation angle in the Y direction is set to equal the vertical angle of view of the CCD 13 in consideration of geometric conditions such as the focal length of the taking lens 12, the length in the vertical direction (in the Y direction) of the light receiving surface of the CCD 13 and the distance between the taking lens 12 and the CCD 13. Therefore, the shooting ranges of the frames where the rotation angles in the X direction are the same do not overlap one another and are continuous in the vertical direction.

In supplying the CCD with the shooting specification, the system controller 19 outputs a direction signal including the rotation angles at that time in the X and Y directions of the prism 11. Therefore, from the shooter 1, a video signal of the CCD 13 and the direction signal are output in synchronism.

By rotating the prism 11, the shooter 1 of the present embodiment which is structured and operates as described above is capable of shooting a wider angle of view than an original angle of view limited by the focal length of the taking lens 12, the size of the light receiving surface of the CCD 13 and the distance therebetween. Further, the shooting ranges are continuous. In addition, since not the entire shooter 1 but only the prism 11 is rotated, the shooting of a wide range is easily performed in a short period of time.

Figure 2:
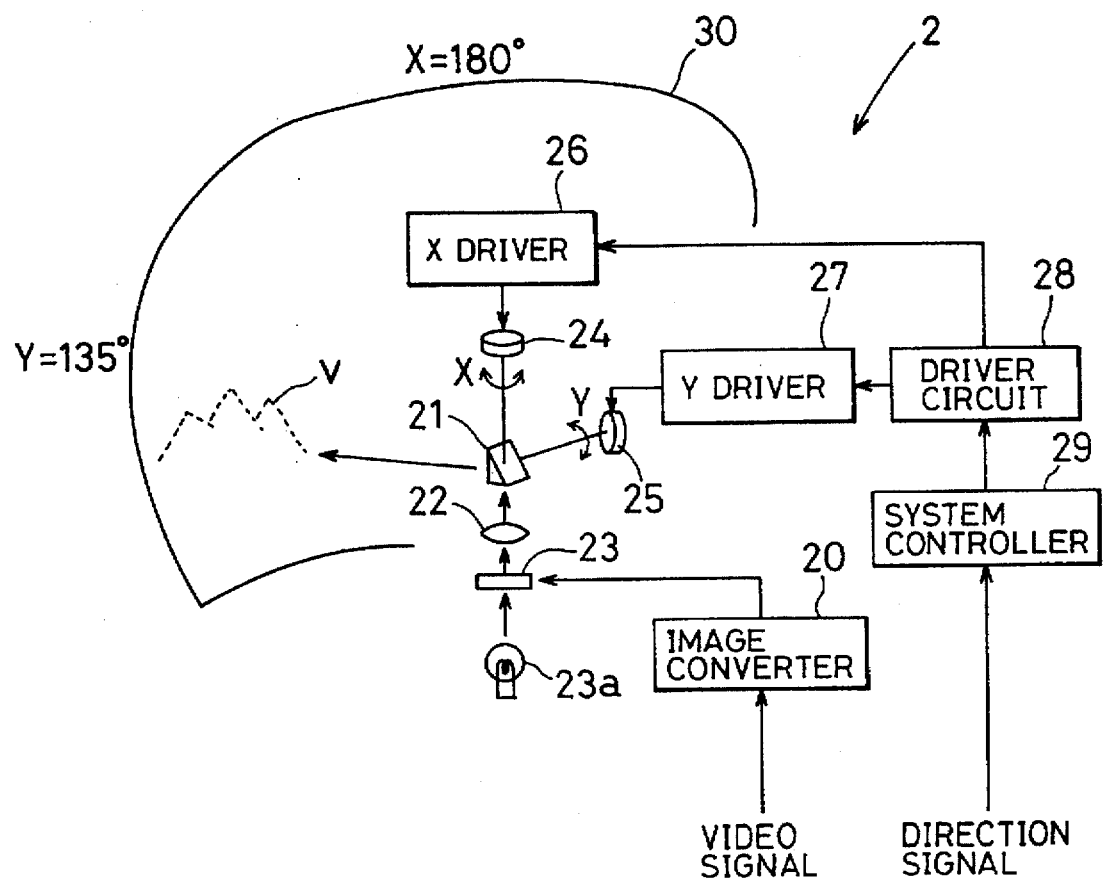
FIG. 2 schematically shows the arrangement of a display of the panoramic vision apparatus of the present invention.

Subsequently, the display 2 which displays an image shot by the shooter 1 will be described. FIG. 2 schematically shows the arrangement of the display 2.

In FIG. 2, reference numeral 21 represents a prism which is rotatable in the horizontal and vertical directions, reference numeral 22 represents a projector lens, reference numeral 23 represents a liquid crystal panel which displays an image, and 23a represents a back light source for the liquid crystal panel 23. Reference numeral 24 represents a motor which rotates the prism 21 in the horizontal direction (i.e. in the X direction), and reference numeral 25 represents a motor which rotates the prism 21 in the vertical direction (i.e. in the Y direction). Reference numeral 26 represents a driver which supplies a driving signal to the motor 24, and reference numeral 27 represents a driver which supplies a driving signal to the motor 25. The drivers 26 and 27 are controlled by a system controller 29 through a driver circuit 28. The system controller 29 is supplied with the direction signal from the shooter 1.

Reference numeral 20 represents an image converter which converts a video signal into a signal for driving the liquid crystal panel 23. The image converter 20 is supplied with the video signal from the shooter 1. Reference numeral 30 represents a screen for projecting thereonto an image displayed on the liquid crystal panel 23. V represents an image projected onto the screen 30.

The prism 21, the liquid crystal panel 23 and the light source 23a are arranged on the optical axis of the projector lens 22. The rotation range of the prism 21 is 180° in the X direction and 135° in the Y direction. The prism 21 rotates at up to 90° from the front to the left and right, respectively, and from 0° to 135° in the vertical direction. The back light from the light source 23a having been transmitted by the liquid crystal panel 23 passes through the projector lens 22 and then is reflected by the prism 21. Therefore, the image displayed on the liquid crystal panel 23 is projected onto different positions on the screen 30 as the prism 21 rotates. The size and configuration of the screen 30 are set such that all the light beams projected by the rotation of the prism 21 are received and that the entire area is located at an equal distance from the prism 21.

The projection angle decided by geometric conditions such as the focal length of the projector lens 22, the horizontal and vertical dimensions of the liquid crystal 23 and the distance between the projector lens 22 and the liquid crystal panel 23 is set to equal the angle of view of the shooter 1 in both the horizontal and vertical directions.

The operation of the display 2 structured as described above will be described. The video signal and the direction signal are output in synchronism by the shooter 1 during shooting, so that the video signal and the direction signal in synchronism with each other are input to the image converter 20 and to the system controller 29. The system controller 29 extracts the rotation angle in the X direction and the rotation angle in the Y direction from the direction signal input thereto and supplies the angles to the driver circuit 28 to rotate the prism 21 through the X driver 26 and the Y driver 27. Thereby, the direction of the prism 21 is set to be the same as the direction of the prism 11 of the shooter 1 in the shooting.

Supplied with the video signal, the image converter 20 causes the liquid crystal display panel 23 to display the image. The image displayed on the liquid crystal panel 23 is projected onto a part of the range of the screen 30 by the back light through the projector lens 22 and the prism 21.

Since the shooter 1 performs shooting while rotating the prism 11 in the X and Y directions, the prism 21 of the display 2 is rotated in the X and Y directions similarly to the prism 11 so that the projected light is scanned on the screen 30. Further, since the projection angle of the display 2 is set to equal the angle of view of the shooter 1 as described above, the frames where continuous ranges are shot are projected on continuous positions on the screen 30. Thus, the images of the entire shot ranges do not overlap one another but are continuously reproduced on the screen.

The panoramic vision apparatus of the present invention including the shooter 1 and the display 2 is capable of shooting a wide range and of reproducing and displaying the image in a wide range. The image of the display 2 is presented in front of, on the right and left and above the viewer, so that the viewer watches only a part of the image of the wide range. Thus, a natural image can be viewed as if the viewer were at the shooting spot.

While light beams from different directions are directed to the CCD 3 by the rotation of the prism 11 in the shooter 1 of the present embodiment, another optical device such as a polygonal mirror may be used instead of the prism 11 so that light beams from different directions are directed to the CCD 3 by the rotation of the optical device. Likewise, another optical device may be used instead of the prism 21 in the display 2 so that the projection direction is changed by the rotation of the optical device. Further, instead of rotating one optical device in the horizontal and vertical directions, an optical device rotating in the horizontal direction and another optical device rotating in the vertical direction may be used in combination.

Obviously, many modifications and variations of the present invention are possible in light of the above teachings. It is therefore to be understood that within the scope of the appended claims, the invention may be practiced other than as specifically described.

What is claimed is:

1. A panoramic vision apparatus comprising:

an image sensing device which receives a light beam to output a video signal;

a taking lens which forms an incident light beam into an image on the image sensing device;

a first optical device which is rotatable and causes light beams from different directions to be incident on the taking lens by a change of direction of the first optical device by a rotation of the first optical device;

first driving means for rotating the first optical device;

first controlling means for controlling the first driving means so that the direction of the first optical device is changed to a predetermined direction, said first controlling means outputting a direction signal representative of the direction of the first optical system in synchronism with the video signal output from the image sensing device;

a display panel to which the video signal from the image sensing device is input to display an image;

a projector lens which projects an image light beam of the display panel;

a second optical device which is rotatable and changes a direction in which the image light beam transmitted by the projector lens advances by a change of direction of the second optical device by a rotation of the second optical device;

second driving means for rotating the second optical device; and second controlling means to which the direction signal from the first controlling means is input to control the second driving means so that the direction of the second optical device is changed to the direction represented by the signal.

2. A panoramic vision apparatus according to claim 1, wherein said first optical device and said second optical device each rotate in two directions.

3. A panoramic vision apparatus according to claim 1, wherein said first optical device and said second optical device are prisms.

4. A panoramic vision apparatus according to claim 1, wherein said first optical device and said second optical device are polygonal mirrors.

5. A panoramic vision camera comprising:

an image sensing device which receives a light beam to output a video signal;

a taking lens which forms an incident light beam into an image on the image sensing device;

an optical device which is rotatable and causes light beams from different directions to be incident on the taking lens by a change of direction of the optical device by a rotation of the optical device;

driving means for rotating the optical device; and controlling means for controlling the driving means so that the optical device is continuously rotatably changed in a first plane from an initial position by a first predetermined angle to a maximum position, rotating the optical device in a second plane by a second predetermined angle and then continuously rotating the optical device in said first plane by said first predetermined angle from said maximum position to said initial position and repeating said operation of rotating the optical device in said second and first planes until a maximum position in said second plane is reached and then returning said optical device to the initial positions and repeats said rotation operation, said controlling means outputting a direction signal representative of the direction of the optical system in synchronism with the video signal output from the image sensing device.

6. A panoramic vision projector comprising:

a display panel which is supplied with a video signal to display an image;

a projector lens which projects an image light beam of the display panel;

an optical device which is rotatable and changes a direction in which the image light beam transmitted by the projector lens advances by a change of direction of the optical device by a rotation of the optical device;

driving means for rotating the optical device; and controlling means supplied with a signal representative of a direction, said signal being in synchronism with the video signal supplied to the display panel, said controlling means controlling the driving means so that the direction of the optical device changed to the direction represented by the signal by moving in a first direction from an initial position by a first predetermined angle to a maximum position, rotating the optical device in a second direction by a second predetermined angle and then continuously rotating the optical device in a direction opposite to said first direction by said first predetermined angle from said maximum position to said initial position and repeating said operation of rotating the optical device in said first and second directions until a maximum position in said second direction is reached and then returning said optical device to the initial positions and repeating said rotation operation.

* * * * *